United States Patent [19]

Cedarleaf

[11] Patent Number: 5,370,921
[45] Date of Patent: Dec. 6, 1994

[54] LIGHTNING STRIKE COMPOSITE AND PROCESS

[75] Inventor: Calvin P. Cedarleaf, Orinda, Calif.

[73] Assignee: The Dexter Corporation, Pittsburg, Calif.

[21] Appl. No.: 728,642

[22] Filed: Jul. 11, 1991

[51] Int. Cl.$^5$ .................. H02G 13/00; B32B 3/10; B32B 5/02; B32B 7/00

[52] U.S. Cl. .................. 428/138; 174/2; 174/3; 428/236; 428/237; 428/240; 428/247; 428/256; 428/285; 428/302

[58] Field of Search .............. 428/245, 247, 256, 284, 428/285, 286, 283, 929, 901, 413, 138, 137, 241, 236, 237, 240, 302; 174/2, 3

[56] References Cited

U.S. PATENT DOCUMENTS

| | | | |
|---|---|---|---|
| 4,186,237 | 1/1980 | Propp | 174/2 |
| 4,421,827 | 12/1983 | Phillips | 428/418 |
| 4,477,512 | 10/1984 | Thomas et al. | 428/251 |
| 4,617,056 | 10/1986 | Mosser et al. | 106/1.12 |
| 4,678,699 | 7/1987 | Kritchersky et al. | 428/256 |
| 4,830,908 | 5/1989 | Nakajima et al. | 428/247 |

Primary Examiner—James D. Withers
Attorney, Agent, or Firm—George A. Skoler

[57] ABSTRACT

A lightning strike coating composition for composites. The composite is multilayered and comprises (i) a prepreg containing layer, (ii) a lightweight, highly conductive metallic wire screen or foil layer, and (iii) a sheet of lightweight carrier fabric containing (a) on one side a coating of a highly filled, thermoset resin in which the filler comprises a multimodal combination of filler particles, and (b) optionally, on the other side an adhesive joining it to layer (ii); wherein the layers are bonded to each other. Also, a process for making the multilayered composite by bonding prepreg assemblies, optionally with a honeycomb structure, to at least one layer of conductive metal screen or foil, bonding the metal screen or foil to one surface of a carrier fabric sheet that is normally not conductive, the other side of the carrier sheet is bonded to the surface coating of a highly filled, thermosettable resin in which the filler comprises a multimodal combination of filler particles, whereby to form a composite assembly, subjecting the composite assembly to sufficient heat to cure the prepregs, honeycomb structures and the surface coating to form a cured composite structure.

8 Claims, 1 Drawing Sheet

LIGHTNING STRIKE COMPOSITE AND PROCESS

BRIEF DESCRIPTION OF THE INVENTION

A multilayered composite comprising (i) a prepreg containing layer, (ii) a lightweight, highly conductive metallic wire screen or foil layer, and (iii) a lightweight carrier fabric containing (a) on one side a coating of a highly filled, thermoset resin in which the filler comprises a multimodal combination of filler particles, and (b) on the other side, bonding to layer (ii); and wherein the layers are bonded to each other.

BACKGROUND TO THE INVENTION

SynSkin TM, sold by The Dexter Corporation, Adhesive & Structural Materials Division, Pittsburg, Calif. 94565 U.S.A., is a composite surfacing film that provides aerodynamic smoothness and protects composite surfaces with a resistant, paintable surface. Films of this type produce surfaces with less porosity and less composite fabric mark-through when cocured on composite structures. Additionally, these films minimize core mark-through and core crush in cocured, honeycomb stiffened composite parts. SynSkin TM is characterized to provide the following advantages in composite construction:

No time consuming finishing steps, resulting in greater productivity, without damage to sensitive parts.
High quality surfaces free of core mark-through.
Prevents core crush during cure of honeycomb stiffened parts.
Provides durable high quality paintable surfaces.
Compatible with a wide variety of composite prepregs and materials.
Storable at ambient temperatures which provides long out-time to accommodate large composite assembly.
Cocurable, sandable and machinable.
Easy to lay up.
Supplied with lightweight compatible fiber mat carrier.

Prior to SynSkin TM, conventional composite surfacing films comprised lightweight epoxy film adhesives designed for structural bonding. These adhesives have been adapted secondarily for surfacing applications. They require extensive filling, sanding and leveling to remove surface irregularities. Those extra steps are not only time consuming and costly, but they also frequently damage the composite part.

This conventional (non-SynSkin TM) approach involves the application of a low flow adhesive film onto a tool face, bonded to the exterior surface of the part. The purpose of doing this is to translate the smooth and level tool surface characteristics onto the face of the cured composite. These films, however, are ineffective in distributing areas of uneven pressure developed in the part during cure. These areas are caused by prepreg warp and fill yarns and by honeycomb cell contact points. They result in highly irregular surfaces radiated to the surface by imprinting from the composite fabric and honeycomb caused by this uneven pressure developed during cure, and porosity and pitting from resin migration.

Cedarleaf, in an article entitled "NOVEL COMPOSITE SURFACING FILM," Published by SAMPLE (Society For The Advancement Of Material And Process Engineering), volume 35, book 2 of 2 books, entitled "Advanced Materials: The Challenge For The Next Decade," describes SynSkin TM and its use in composites. According to the article:

"The development of a resin system for the SynSkin TM line of products focused on simultaneously solving the problem of leveling, flow, porosity, and core crush during cure of a composite sandwich. These problems normally occur when cocuring carbon fiber prepreg/honeycomb sandwich structure with a conventional adhesive surfacing material.

"Leveling is the process of distributing areas of uneven pressure to give a flat surface after cure. Potential causes of uneven pressure are prepreg warp and fill yarns and contact points of the honeycomb cell walls on the prepreg. Honeycomb mark off and its associated problems were the most difficult to overcome."

The severity of core crush additionally depends upon the cure pressure, the stiffness of the honeycomb core, bevel angle of the core in the sandwich structure, and resin content and flow properties of the prepreg resin. In addition to the resinous properties of surfacing films, factors which promote core crush are high cure pressure, weak honeycomb, high honeycomb bevel and high resin content with low flow in the prepreg matrix. Although the SynSkin TM filled resin films do not totally prevent core crush under severe conditions (i.e., those stated above), their use on honeycomb composite structures significantly minimizes core crush compared to the conventional procedures.

According to Cedarleaf, SynSkin TM was being developed to incorporate lightning strike protection. In the article, Cedarleaf stated:

"Work to incorporate materials into SynSkin TM to provide lightning strike protection shows early positive performance and will be pursued.

"Potential applications currently under evaluation range from engine cowlings to helicopter blades, aircraft interior panels, lightning strike exterior parts and composite tools."

Cedarleaf does not indicate how lightning strike protection was incorporated "into SynSkin TM. He indicates that that is an important project for development in SynSkin TM structures or compositions.

Traditionally, lightning strike protection is afforded to the conventional prepreg based composite by incorporating thin conductive foils or screens into the surface coating layer of the composite. There are conductive thin metal films and screens that are suitable for use in aircraft prepreg based composites that provide a number of advantages, such as low cost, uniformity, light weight, nonflaking, conformability, superior conductivity, improved repairability, no high resistance crossover points, ability to withstand repeated lightning strikes, and the like features.

One such product is called Astro Strike TM Screening, sold by Astroseal Products Manufacturing Corp., Old Saybrook, Conn., 06475. Another is called Micro-Grid ® Precision-Expanded Foils, sold by Delker Corp., Branford, Conn. 06405.

However, when they are provided in the outer coating of the composite, a number of problems occur. When using a thin adhesive film as a surface ply between the tool and conductive metal foil, the adhesive flows under cure conditions and does not form a discrete barrier layer on the composite surface. As a result, the conductive foil lays on the exterior of the cured structure. This configuration for the conductive metal foil makes the composite part vulnerable to surface microcracking during thermal cycling, presumably promoted in part by expansion differences between the metal foil and unfilled resin matrix during thermal conditioning. Additionally, because the metal foil lays on top of the composite structure, routine sanding and finishing steps required for painting the exterior creates the probability of damaging the conductive screen.

There is need, as expressed by Cedarleaf, for a composite structure that effectively incorporates lightning strike protection while at the same time affords the surface finishing advantages of SynSkin TM.

THE INVENTION

There is described herein a novel composite structure and method of surfacing metal screen or foil lightning strike protected composite structures that eliminates microcracking at the surface, and at the same time protects the metal screen or foil during sanding and finishing.

This invention relates to a multilayered composite comprising (i) a prepreg containing layer, (ii) a lightweight, highly conductive metallic wire screen or foil layer, and (iii) a sheet of lightweight carrier fabric containing (a) on one side a coating of a highly filled, thermoset resin in which the filler comprises a multimodal combination of filler particles, and (b) optionally, on the other side, adhesive bonding to layer (ii); and wherein the layers are bonded to each other.

The invention also relates to a process for making the multilayered composite. The method adhesively bonds prepreg assemblies, with or without honeycomb structure, to at least one layer of conductive metal screen or foil. In turn, the metal screen or foil is bonded to one surface of a carrier fabric sheet that is normally not conductive. This bonding may be effected through the addition of an adhesive layer or via cure of the prepreg layer, which acts to adhesively bond the screen or foil by flowing through openings, such as mesh openings, in the screen or foil layer. The other side of the carrier sheet is bonded to the surface coating of a highly filled, thermosettable resin in which the filler comprises a multimodal combination of filler particles. Upon completion of the layup of the composite assembly, the composite assembly is subjected to sufficient heat to cure the prepregs, honeycomb structures and the surface coating to form a cured composite structure.

The carrier sheet with its coating serves to avoid transmitted imprints from the composite fabric, inclusive of honeycomb structures therein, as a result of uneven pressure developed during cure. In addition, the carrier sheet prevents filler migration into the composite, thereby blocking the kind of porosity and pitting that existed in prior art practices from resin migration when such carrier sheets and highly filled coatings are not used.

The composite of the supported, filled resin surfacing film, bonded via the support surface to the conductive metal screen or foil, places the screen or foil very much in the proximity of the cured prepreg-based composite's exterior surface where it can conduct away a lightning strike. The filled resin surface and the support carrier do not interfere in a manner that prevents the screen or foil from conducting away a lightning strike at a given point on the composite. Also, the filled supported film is not disrupted by the screen or foil because of its filler content and the presence of the intervening nonwoven support surface. This combination serves to provide a durable, conductive exterior surface for the cured prepreg based composite. The supported, filled film forms a discrete barrier layer during cure with the composite assembly that prevents the conductive metal screen or foil from reaching the exterior surface. This discrete surface film minimizes surface microcracking under thermal cycling conditions. Additionally, such surfaces are amenable to sanding and other surface preparation techniques used during painting and finishing operations, thus providing for a more cosmetically appealing structure.

The highly filled, thermoset resin based film contains a multimodal distribution of filler particles. It is supported on one side by the lightweight, nonwoven carrier fabric. The highly conductive metallic screen or foil (typically expanded) for lightning strike protection of composite structures is bonded to the carrier fabric.

During cure, the filler in the surface film packs and orients so that the packed structure distributes the pressure exerted on it by the conductive screen or foil, essentially uniformly across the entire composite outer surface. The carrier fabric restricts movement of the filled system to the tool side of the composite assembly and keeps the screen or foil away from contact with the tool, thereby giving integrity to the filled system. Prepreg resin (and, to a lesser extent, surface film resin) migrates out of the fiber reinforcement and into the perforations in the screen or the expanded foil, thus consolidating the composite's exterior portion (or layer) with the rest of the structure. Additional adhesive resin in the form of film which preimpregnates the screen or the expanded foil aids in consolidating the structure. This, however, adds weight to the final assembly. For that reason, to the extent such adhesive resin can be avoided, it is desirable to do so.

Resulting structures have a discrete surface layer provided by the supported filled surface film. This layer acts as a barrier to prevent the screen or expanded foil from reaching the composite exterior.

BRIEF DESCRIPTION OF THE DRAWINGS

FIG. 2 provides for an assembly in which the lightning strike screen or foil is bonded to a prepreg layer and the carrier sheet, via the resins used to cure the prepreg.

DETAILED DESCRIPTION OF THE INVENTION

Figure 1:
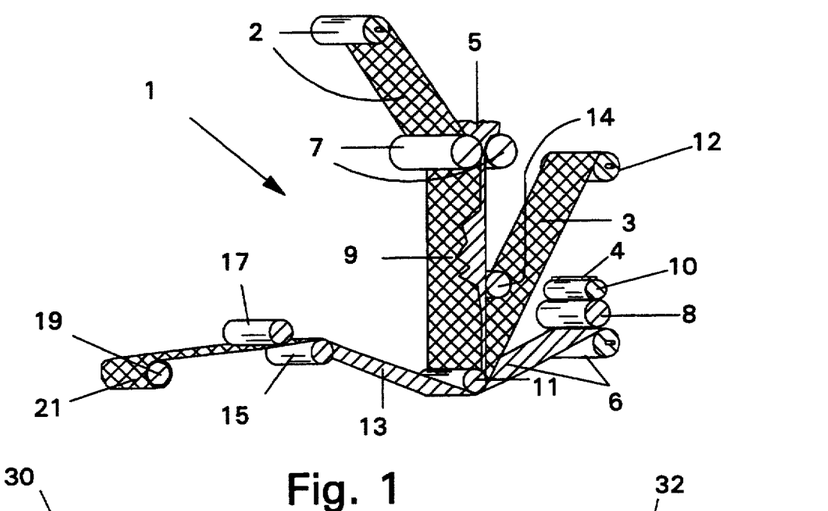
FIG. 1 is a schematic perspective (partially isometric) illustration of a calendaring system by which to make the composite of the surface coating, the carrier sheet and the lightning strike screen or foil.

Calendaring of the thermosetting highly filled resin formulation into a thin films bonded to the nonwoven carrier sheet is illustrated in FIG. 1. In addition, FIG. 1 illustrates an optional feature which includes bonding lightning strike metal screen or foil to the thermosetting highly filled resin formulation. As shown in FIG. 1, which is an isometric-like schematic illustration of calendaring line 1 for calendaring a film of a highly filled thermosetting matrix resin formulation feed 5, the feed is fed to nip rolls 7 into contact with release film 2, such as polyethylene film, and the like, withdrawn from its feed roll 2. Nip rolls 7 are calendar rolls spaced apart to the desired thickness of the film 9. The matrix resin 5 is fed to the nip of the rolls 7, it is calendared out into a thin film sheet 9. It is desirable in the practice of the invention to avoid imparting a drawing action on sheet 9 after extrusion formation by rolls 7. Rolls 7 may vary in width, wider rolls generating more throughput and narrower rolls providing more control over film thickness from edge to edge. Because this invention is concerned with films of essentially uniform thickness from edge to edge, and front to back, it is desirable to use calendar rolls that are less than about 60 inches wide. A convenient width is about 12 to about 48 inches. Manufacture of films meeting the specifications of this invention are easier at those widths. Because the viscosity of feed 5 is not excessive, one may look at the calendaring operation as a filming operation, akin to roller coating. The distance between rolls 7 is maintained by a force balance (not shown) between the hydraulic pressure pushing on the roll and the off-setting matrix fluid pressure acting in the opposite direction to the roll. This results in the formation of 9 which is a composite of release film 2, shown in cutaway in the figure in order to illustrate the presence of the resin film. Once sheet 9 is formed, it is frequently desirable to increase the matrix resin viscosity in the film. Temperature reduction of sheet 9 increases viscosity which reduces flow within the film and thus helps to preserve its dimensions. This may be accomplished by passing sheet 9 over or otherwise in contact with chilled roller 14. Roller 14 is chilled through internally cooling using internal jacketing, to temperatures from about 0° C. to about 25° C., sufficiently low enough to prevent any sagging or flow of the resin matrix. The chilled roller, by cooling the film, increases the resin's elastic modulus so that resin flow is decreased and film dimensional stability is maintained.

The chilled sheet 9 is then fed to guide roller 11. This roller functions to guide and align nonwoven carrier sheet 3 and metal lightning screen or foil 6 so that they composite with sheet 9 to form composite sheet 13. In that activity, roller 11 may also function as a take-up roller if such is desired. In the preferred embodiment, guide roller 11 is at a temperature sufficient to cured adhesives provided to effect bonding of the composite. The temperature of guide roller 11 may range from about 20° C. to about 65° C. A preferred temperature ranges about 35°–40° C.

As indicated, an optional feature of the calendaring line of FIG. 1 involves compositing the thin metal lightning strike screen or foil to sheet 9. Nonwoven carrier sheet 3, in the form of a continuous sheet withdrawn from continuous feed roll 12, is initially placed under guide roller 11 into contact with film 9. Then continuous film of the metal screen or foil from roll 6 is fed over roller 11, into contact with sheet 9 and nonwoven carrier sheet 3. To assure bonding of screen or foil 6 to sheet 3, an adhesive resin film is roller coated via roller 8 onto the screen or foil. The adhesive resin is supplied to roller 8 by reverse roller coater 10 onto which is coated the adhesive resin with the aid of knife coater 4.

Sheet 13 may be a composite of film 9 of resin 5 (associated with release film 2) and sheet 3, or a composite of resin film 9, sheet 3 and screen or foil 6. Sheet 13 is then passed under or over guide rolls 15 and 17, as may be the case, to form the composite for forming lightning strike prepreg containing composite of the invention. These latter rollers can be chilled if desired to control resin flow in the composite. This intermediate composite of the invention is rolled (21) up onto core 19.

Figure 2:
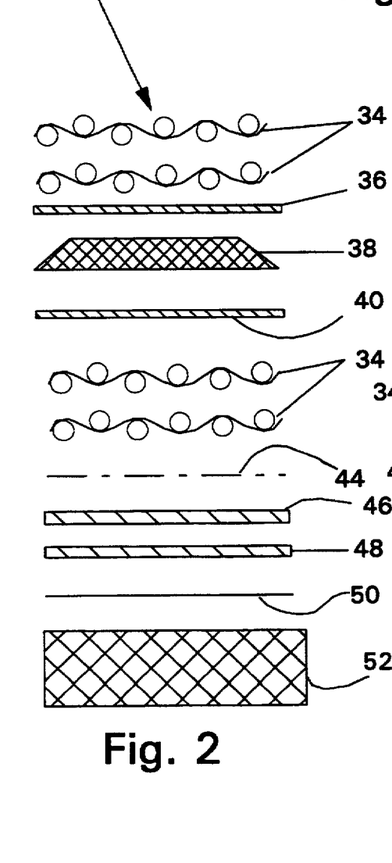
FIGS. 2 and 3 schematically illustrates two different assemblies for the composites of the invention.
Figure 3:
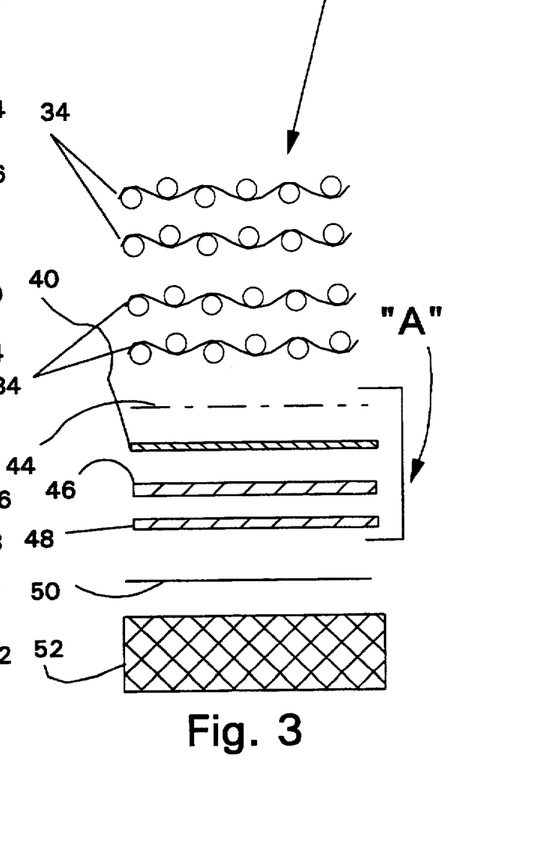

FIGS. 2 and 3 illustrate some conductive composites within the scope of this invention. FIGS. 2 and 3 illustrate the assembly of composite structures with the lightning strike surfacing method of the invention. In FIG. 2, composite assembly 30 comprises a honeycomb core 38, whereas in FIG. 3, composite assembly 32 distinguishes from assembly 30 in the use of a composite sheet "A", which comprises a prebonded composite of metal screen or foil 44 and sheets 46 and 48. In both figures, the highly filled resin surfacing film 48 is applied onto the face of tool 52. Tool 52 is typically sanded smooth and treated with a release agent film 50 such as Frekote ® 700 (sold by The Dexter Corporation, Adhesive & Structural Materials Division, Pittsburg, Calif. 94565 U.S.A.). The nonwoven carrier sheet 46 is bonded to film 48. In the case of FIG. 3, composite assembly 32 employs a prebonded intermediate composite "A" which comprises screen or foil 44, adhesive resin layer 40, nonwoven carrier sheet 46 and highly filled surface coating resin 48. The metal screen or expanded metal foil 44, unattached to the surfacing film, as shown in FIG. 2, is laid on top of the support sheet (the nonwoven fabric) 46 covering the filled resin film layer 48. Prepreg layers 34 and honeycomb core 38 (if used as shown in FIG. 2) are laid on top of the screen or expanded foil 44. As shown in assembly 30 of FIG. 2, adhesive films 36 and 40 are used to bond the honeycomb core 38 to the composite assembly 30. Cure is facilitated by standard vacuum bag and autoclave techniques. Temperature and pressure of the cure is dependent upon the reactivity of both the prepreg resin and the resin system in the surface film. Typically, cure temperatures of 120° C.–175° C. are used. Cure pressures from 28" Hg vacuum to 45 psi are typical for honeycomb stiffened structures and may be greater for solid laminate structures.

The preferred form of the supported, filled resin film is SynSkin TM but the invention encompasses a range of supported, filled resin films. The metal screen or expanded metal foils are composed of highly conductive metals (e.g., copper, aluminum, nickel, silver) and vary in weights from 0.01 psf to 0.08 psf.[1] Examples of such products are Astro Strike TM Screens (Astroseal Products Manufacturing Corp.) and MicroGrid ® Precision-Expanded Foils (Delker Corp.).
[1] Pounds per square foot.

Astro Strike TM Screening, a non-woven metallic mesh, provided in a foil thickness of from 0.003 inch to 0.015 inch, and open area between 15% to 85%, thus weighing as little as 0.01 lb/sq.ft., is recommended for use in shielding and lightning protection of composite aircraft or other structures. It is provided in a variety of configurations in both copper and aluminum, even highly pure forms of each, though other materials are obtainable. It is produced from solid foil or film and perforated so as to provide formability and adhesion to composite laminate structures. Conventionally, it has been successfully applied to composite structures both by cocuring and secondary bonding.[2] In tests, the lightest weight copper screen (0.022 lbs./sq.ft.) is alleged to be satisfactory in a simulated Zone 1 lightning test (200,000 amps) when cocured on the outer surface of a graphite test panel.
[2] In cocuring application, the conductive material is placed on the outer surface in order to maximize the lightning protection effectiveness, to minimize the amount of heat from a strike within the panel and to simplify repair in the event of mechanical damage. The manufacturer illustrates this method as involving first the application of an uncured or B-stage film adhesive to the surface of the tool or mold. Astro Strike is applied next, followed by the prescribed number of prepreg layers. The tacky adhesive serves to hold the screening in place against the mold surface during the lay-up operation, thereby eliminating any tendency to wrinkle. Secondary curing has been performed in retrofit situations. Both B-stage film adhesive and liquid adhesives have been used. Film adhesive seems to be preferred as a way of maintaining uniform adhesive thickness. Secondary curing can also be considered in certain situations where panel distortion results from differences in coefficients of thermal expansion between metal and fiber. This can occur when aluminum, with relatively high thermal expansion is cured at 350° F. with graphite which has nearly zero expansion, and when the graphite panel is particularly thin.

MicroGrid ®, according to the manufacturer, is produced by slitting and stretching a single roll of very thin foil to create openings of exact dimensions. The number of openings can vary from as few as 25 per square inch to as many as 2600, and the open area can be as large as 95% or as small as 30%. It is produced in standard, diamond mesh sizes ranging from 0.416 inch to 0.031 inch. It has a uniform electrical conductivity, which surpasses that of discreet metal fibers and wire cloth and proportions between the length and width of its openings can be custom engineered to produce exact amounts of specified conductivity. MicroGrid ® can be bent, shaped and laminated with a variety of other materials, including those which expand, contract and flex, making it suitable for lightning strike protection RFI/ESD shielding. MicroGrid ® foils are available in most metals and alloys, and they are typically made of aluminum, brass, copper, monel, nickel, steel, stainless steel, zinc, and the like. The following table illustrates the range of foil meshes that may be employed for lightning strike protection applications.

| Mesh Designation | Mesh Size LWD | Mesh Size SWD | Approx. Opening Per Sq. Inch | "Normal" Range Open Area |
|---|---|---|---|---|
| 416 | .416" | .166"–.220" | 25 | 65–95% |
| 284 | .284" | .110"–.125" | 60 | 50–90% |
| 189 | .189" | .077"–.091" | 130 | 45–90% |
| 125 | .125" | .055"–.062" | 275 | 35–80% |
| 100 | .100" | .044"–.053" | 400 | 30–80% |
| 077 | .077" | .038"–.043" | 635 | 30–70% |
| 050 | .050" | .027"–.030" | 1400 | 30–65% |
| 031 | .031" | .020"–.022" | 2600 | 30–60% |

In the above table, LWD is the length of the long axis way of the diamond opening of the mesh, measured from the center of the joint to the center of the adjoining joint. This dimension is built into the tool, and corresponds with the mesh dimension. SWD is the length of the short axis way of the diamond opening, measured from the center of the joint to the center of the adjoining joint. For each fixed LWD dimension, there is a range of SWD dimensions stated above.

As pointed out above, it is not necessary to preattach the metal screen or foil to the supported film surfacing ply before assembly into the composite structure; however, the metal screen or foil can be attached to the nonwoven fabric side of the surfacing film by lightly spraying or coating the carrier fabric with adhesive. An example of such an adhesive is EA 9704.1 Tack Coat (sold by The Dexter Corporation, Adhesives & Structural Materials Division).

An additional product form of the screen or expanded foil is one in which the foil is preimpregnated with a low flow adhesive resin such as LF 29108.0 (also obtainable from The Dexter Corporation). Typical adhesive areal weight ranges from 0.02 psf to 0.04 psf.

The unique performance of SynSkin TM films is provided by the multimodal distribution of filler particles in the resin film, and in the ability of the nonwoven carrier fabric to aid in restricting these particles to the tool side of the film when cured. SynSkin TM provides the proper particle size, shape and loading level that gives superior particle packing and orientation in the resin blend. This filler packing and orientation is better able to distribute pressure exerted on the prepreg fabric throughout the entire composite surface during cure, which results in less mark-through and reduced porosity and pitting of the surface.

Restricting flow in the resin film matrix is best accomplished through selection of a high viscosity base resin system and by addition of thixotropic fillers such as famed silica.

The carrier fabric may be an interlocked fabric in which the fibers are derived from staple or continuous filament forms. The fibers may be tow, twisted or untwisted, spun, crimped and the like varieties. The fabrics are interlocked by textile processes such as weaving, knitting, needle punching, latch stitching and adhesive bonding. It is desirable that the fabric be a lightweight cloth and that the fabric's surface is closed to easy penetration by a filled resin coating. Because of the last point, it is desirable that the fabric's surface be such that the fibers are close to each other to block resin flow. This means that if the fabric is woven or knitted, the yarns or filaments are closely packed, that is, tightly woven or knitted, so that the filled resin will not penetrate the fabric. It is desirable that the fabric weigh from about 0.2 oz/yd$^2$ to about 2.0 oz/yd$^2$.

A preferred form of the carrier fabric is a nonwoven cloth of from 0.2 oz/yd$^2$ to about 2.0 oz/yd$^2$, preferably from about 0.3 oz/yd$^2$ to about 1.5 oz/yd$^2$. The filled resin system is applied to one side of the cloth fabric. Cloth fiber types include, for example, polyester, carbon, nylon, and glass, in the form of filament or long staple fibers, such as longer than about $\frac{1}{4}$ to $\frac{1}{2}$ inch. The nonwovens of choice are those of the spunbonded or long staple crosslapped garnetted or carded varieties. They comprise randomly deposited continuous filament fiber or staple fiber of extreme fineness or low denier per filament that are resin bonded. They are commercially available from a number of sources, such as Reemay TM (polyethyleneterephthalate fiber) from Reemay, Inc., Tyvec TM (polypropylene fiber) from DuPont de Nermour & Co., and Cerex 4007 TM (nylon fiber) from James River Mills. The carrier cloth may also be made of nonwoven staple or continuous carbon or glass fibers. Suitable carbon filament or staple[3] and glass filament or staple carrier cloths are obtainable from International Paper.

[3] A illustrative carbon mat is a nonwoven 1" staple fiber carbon cloth of 0.21 ox/yd$^2$ weight (ASTM D-1910) bound with polyester resin. Thickness 0.002 inch (ASTM D-1777), Strength (Dry) 1.11 lb/in. M.D., 1.06 lb/in. C.D., Stretch (Dry) 0.67% M.D., 0.79% C.D. (ASTM D-1682).

These nonwovens are distinguished by typically being drapable (i.e., having the ability to easily conform to the shapes of another surface), opaque and by having relatively flat uniform surfaces that do not contribute unwanted patterns to the coated surface of the ultimate prepreg based composite.

Especially important to the performance of SynSkin TM and comparable films suitably employable in the practice of the invention, is the fillers provided in the resin film. They contribute significantly to obtaining the smooth and level surface on a composite part. The choice of them is determined by particle shape, size and volume loading. One may employ a combination of flat, platelet and/or rod shaped particles and large and small spherical particles. However, good films may be achieved with nonspherical, angular shaped fillers to accommodate a particular application. Asymmetrical (e.g., platelets) shapes orient perpendicular to the film surface and provide a smooth level effect. Incorporation of large and small spherical shapes afford high solids loadings through optimum packing, which enables better pressure distribution throughout the film surface and, additionally, reduce flow of the film due to high solid loadings (i.e., less resin). Filler volume loadings in the resin film from about 5 to about 60% may be used, with preferred loadings from about 30 to about 55%.

The filler particles in the resin film may be either inorganic or organic, provided that they are discrete particulates and are insoluble in the resin matrix. Examples of filler types include:

a) inorganic—silica, mica, other mineral, metallic, ceramic b) organic—polymeric (thermoset, thermoplastic)

Both solid and hollow (e.g., glass bubbles) particulates are useful. Particle sizes from 1-120 microns are preferred; however, sizes outside this range are also useful.

Illustrative of suitable inorganic fillers are the zinc oxides; siliceous fillers encompassing the silicates such as wollastonite, micas, and the like, silicas such as fumed silica, quartz, fused silica, precipitated silicas, xerogels, aerogels, and the like; ceramics such as silica alumina microspheres, hollow microspheres, and the like.

These supported highly filled resin films provide a gritty and less resinous interface between tool and prepreg surfaces, which are more resistant to cure pressure forces and, therefore, minimize the tendency for prepreg movement.

The filled resin films are comprised of conventional thermoset resin systems which include, for example, epoxy based resin systems. The thertoosetting matrix resin suitable for use in the invention comprise those typically used in the manufacture of SynSkin TM. For example, epoxies curing at 350° F. (177° C.) and 250° F. (121° C.) are the most common matrix resins, but matrices of bismaleimide (BMI), phenolic, polyester, PMR-15 polyimide and acetylene terminated resins are usable in the practice of the invention. However, the invention includes as well, other thermosetting resins; indeed, the invention includes the family of thermosetting resins. For example, thermosetting resins from acrylics, polyurethanes, free-radically induced thermosetting resin, and the like, may also be used in the practice of the invention. As a result of such considerable choices in thermosetting resins, the support, highly filled resin films of the invention are tailorable to making composite surface coatings for a wide variety of applications.

Preferably, the invention embraces the use in the supported highly filled surface coating film of thermosetting resins that find use in adhesive applications. Such allows the thin supported film to be applied conveniently to any composite substrate and by virtue of the drapability of the film, have the film cling to the substrate throughout processing and cure, and configure to the substrate.

Though the high filler loading in the thermosetting resin will make it more viscous, it is desirable to add one or more thixotropic agents, other solid resins and/or liquid or thermoplastic elastomeric modifiers to make the resulting film suitably workable to create the finished composite.

The typical thermosetting resin is an A-stage resin. In some cases, it may be desirable to utilize a B-stage resin but in the typical case, such is done in combination with an A-stage resin. Such B-stage resins will affect the viscosity of the resin formulation but they are not relied on to achieve the level of non-pourability for the most effective operation of the invention.

A preferred class of thermosetting resin in the practice of the invention are the epoxy resins. They are frequently based, inter alia, on one or more of diglycidyl ethers of bisphenol A (2,2-bis(4-hydroxyphenyl)-propane) or sym-tris(4-hydroxyphenyl)propane, tris(4-hydroxyphenyl)methane, bisphenol F, tetrabromobisphenol A, their polyepoxide condensation products, cycloaliphatic epoxides, epoxy-modified novolacs (phenol-formaldehyde resins) and the epoxides derived from the reaction of epichlorohydrin with analine, o-, m- or p-aminophenol, and methylene dianaline.

The epoxy resins suitable in the practice of the invention include the various established thermosetting epoxy resins conventionally employed in making prepregs, especially carbon and graphite fiber reinforced prepregs. It is desirable that the epoxy resin be a low or lower viscosity version to facilitate film formation. Illustrations of suitable epoxy resins include, e.g., one or more of diglycidyl ethers of bisphenol A (2,2-bis(4-hydroxyphenyl)propane), such a those of the following formula:

or sym-tris(4-hydroxyphenyl)propane or tris(4-hydroxyphenyl)methane, their polyepoxide condensation products, cycloaliphatic epoxides, epoxy-modified novolacs (phenol-formaldehyde resins) of the formula:

wherein n is 0-1.8, preferably 0.1-0.5.

Other epoxy resins may be combined with the above epoxy resins or used alone. They include, e.g., 3,4-epoxy cyclohexyl methyl-3,4-epoxy cyclohexane carboxylate, vinyl cyclohexene dioxide, 2-(3,4-epoxy cyclohexyl-5,5-spiro-3,4-epoxy)cyclohexane-meta-dioxane, bis(3,4-epoxy cyclohexyl)adipate, and the like.

The epoxy resin systems contain epoxy curing agents to form solid, infusible products. For this purpose, epoxy curing agents which are acidic, neutral or alkaline may be used. Examples include, among others, amines hardeners, phenols, acid anhydrides, polyamides and Lewis acids and bases.

Desirably, the epoxy resins of the invention are combined with hardeners which cure the resin to a thermoset condition. The preferred hardeners are amine com- pounds, ranging from dicyandiamide, to ureas, to aliphatic and aromatic amines. A preferred class of hardeners are the aromatic amines encompassed by the formula:

may be 0 or 1 and is 1 when x is 1, and z may be 0 or a positive integer, typically not greater than about 5.

Preferred hardeners are diamines of the formula:

mula:

wherein Q is one or more of a divalent group such as —SO₂—, —O—, —RR'C—, —NH—, —CO—, —CONH—, —OCONH—, and the like, R and R' may each independently be one or more of hydrogen, phenyl, alkyl of 1 to about 4 carbon atoms, alkenyl of 2 to about 4 carbon atoms, fluorine, cycloalkyl of 3 to about 8 carbon atoms, and the like, x may be 0 or 1, y

Another preferred class of hardeners are the aliphatic amines such as the alkyleneamines. Illustrative of suitable alkyleneamines are the following:

monoethanolamine
ethylenediamine
N-(2-aminoethyl)ethanolamine
Diethylenetriamine
Piperazine
N-(2-aminoethyl)piperazine
Triethylenetetramine
Tetraethylenepentamine
Pentaethylenehexamine
Diaminoethylpiperazine
Piperazinoethylethylenediamine
4-Aminoethyltriethylenetetramine
Tetraethylenepentamine

Aminoethylpiperazinoethylethylenediamine
Piperazinoethyldiethylenetriamine Another class of hardeners, but which can also be used as extender of the epoxy resin, are the higher molecular weight poly(oxyalkylene)polyamines such as those of the following formulas:

$H_2NCHCH_2(OCH_2CH)_yNH_2$ where y is 2-40 (with CH$_3$ groups)

$H_2NCHCH_2(OCH_2CH)_a(OCH_2CH_2)_b(OCH_2CH)_cNH_2$ where a + c is about 2.5 and b is 8-45.

$CH_2(OCH_2CH)_xNH_2$ / CH$_3$
$CHCHCCH_2(OCH_2CH)_yNH_2$ where x, y and z range from about 2-40
$CH_2(OCH_2CH)_zNH_2$ / CH$_3$ $H_2NCHCH_2(OCH_2CH)_mNH(OCH_2CH)_tNH_2$ where m + t is about 82-86.

The hardener may be a monoamine such as aniline, para-aminophenol, and alkylated versions of them.

Other desirable hardeners are the reaction products of dialkylamines, such as dimethylamine, diethylamine, methylethylamine, di-n-propylamine, and the like, with a variety of mono and diisocyanates to form mono and diureas. Any of the polyisocyanates listed below may be so reacted for use as a hardener. Specific illustration of useful hardeners are those encompassed by the following formulas and descriptions:

anate, polymeric isocyanate, p-chlorophenylisocyanate, 3,4-dichlorophenylisocyanate or phenylisocyanate.

Accelerators may also be used and include imidazoles and substituted ureas. Examples include 2-ethyl-4-methylimidazole and p-chlorophenyl-1, 1-dimethyl urea.

The amount of the hardener employed is usually stoichiometrically equivalent on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1. Where any of the hardeners serve primarily as extenders of the epoxide resin, then the amount of the hardener in the typical case will be less than that generally employed for hardening the epoxide. Mixtures the where R is a monovalent organic group;
R' is alkyl, halo, alkoxy, and the like; R" is methylene, isopropylidene, ethylidene, or a covalent bond; and a is 0-4.

Preferred urea hardeners are those that are the reaction products of dimethylamine with mixtures of 80% 2,4-tolylene diisocyanate and 20% 2,6-tolylene diisocy- above hardeners and with other hardeners are within the contemplation of this invention.

Other reactive resin systems include the various thermosetting or thermosettable resins include the bismaleimide (BMI), phenolic, polyester (especially the unsaturated polyester resins typically used in SMC production), PMR-15 polyimide and acetylene terminated resins are also suitable.

The urethane systems represent a typical non-engineering polymer for applications demanding less performance than, for example, the epoxy resin systems. They typically comprise the reaction of a polyisocyanate, a polyol, alone or with another active hydrogen compound, typically in the presence of a catalyst, such as an amine catalyst. However, in the practice of this invention, the polyurethane is a mixture of a blocked polyisocyanate, such as the reaction product of a mono-ol or monohydroxy phenolic compound with a polyisocyanate that is an organic polyisocyanate. This includes an organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates).

The blocked isocyanates are compounds of the formula:

where R is a monovalent organic group;
R' is alkyl, halo, alkoxy. and the like;
andais O-4.

Illustrative polyisocyanates for use in making the blocked isocyanates are:

| | |
|---|---|
| 2,4'-diisocyanatotoluene | 2,6-diisocyanatotoluene |
| methylene bis(4-cyclohexyl isocyanate) | 1,2-diisocyanatoethane |
| 1,3-diisocyanatopropane | 1,2-diisocyanatopropane |
| 1,4-diisocyanatobutane | 1,5-diisocyanatopentane |
| 1,6-diisocyanatohexane | bis(3-isocyanatopropyl)ether |
| bis(3-isocyanatopropyl) sulfide | 1,7-diisocyanatoheptane |
| 1,5-diisocyanato-2,2-dimethylpentane | 1,6-diisocyanato-3-methoxyhexane |
| 1,8-diisocyanatooctane | 1,5-diisocyanato-2,2,4-trimethypentane |
| 1,9-diisocyanatononane | 1,10-diisocyanatopropyl)ether of 1,4-butylene glycol |
| 1,11-diisocyanatoundecane | 1,12-diisocyanatododecane bis(isocyanatohexyl) sulfide |
| 1,4-diisocyanatobenzene | 2,4-diisocyanatotolylene |
| 2,6-diisocyanatotolylene | 1,3-diisocyanato-o-xylene |
| 1,3-diisocyanato-m-xylene | 1,3-diisocyanato-p-xylene |
| 2,4-diisocyanato-1-chlorobenzene | 2,4-diisocyanato-1-nitrobenzene |
| 2,5-diisocyanato-1-nitrobenzene | 4,4-diphenylmethylene diisocyanate |
| 3,3-diphenyl-methylene diisocyanate | polymethylene poly (phenyleneisocyanates) |
| isophorone diisocyanate | and mixtures thereof. |

The preferred polyisocyanates are mixture of 80% 2,4-tolylene diisocyanate and 20% 2,6-tolylene diisocyanate and polymeric isocyanate. The blocked isocyanates comprise any of the above polyisocyanates reacted with a monofunctional hydroxy containing compound. The resultant blocked polyisocyanate is unreactive towards hydroxyl compounds at room temperature but, at elevated temperatures, will function as an isocyanate to crosslink the hydroxyl compounds to form the thermoset resin. For example, an adduct of tolylene diisocyanate and trimethylolpropane is first prepared in solution, followed by the addition of phenol to block the remaining isocyanate groups. Illustrative of such a blocked polyisocyanate is a phenol blocked toluene diisocyanate in cellosolve acetate sold by Mobay Chemical Co., as Mondur S. Such blocked isocyanates, when mixed with the polyols, provide a thermosetting polyurethane matrix resin that can form a tacky thin in situ expandable film that is storable and curable on demand, in accordance with the invention.

The polyols used in forming the polyurethane may be an organic diol, triol, tetraol, pentaol, and the like. Illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed by the alkoxylation of a starter polyol, such as the class of polyols characterized; or formed from reaction of the above diols. triols, etc., with caprolactone. The resulting ester polyols ("Tone's") are widely used in reactions with isocyanate. Desirable alkoxylated polyols are alkylene oxide adducts of a hydroxylated alcohols of the formula:

$$A(OH)_{>1}$$

and preferably a "starter" diol, triol, tetraol and higher hydroxylated alcohols, of the formula:

$$A(OH)_{\geq 2-6}$$

wherein A is a polyvalent organic moiety, the free valence of which is 2-6 or greater, or an average value equal thereto, as the case may be.

Illustrative of suitable compounds embraced by the "starter" $A(OH)_{\geq 2-6}$ alcohol are the following: ethylene glycol, diethylene glycol, 1,2-propylene glycol, polyethylene glycol, polypropylene glycol, glycerine, pentaerythritol, sorbitel, diether of sorbitol, mannitol, diether of mannitel, arabitol, diether or arabitel, sucrose, mixtures thereof, and the like.

The starter $A(OH)_{\geq 2-6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct. The molecular weight of the alkoxylated polyol adduct should be relatively high, preferably above about 4000 (number average) and, more preferably, above about 5000. The minimum molecular weight of the alkoxylated polyol adduct may be about 2000. The preferred 1,2-alkylene oxides are lower 1,2-alkylene oxides, such as ethylene oxide, 1,2-propylene oxide, 1,2-butylene oxide, and the like. The resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art. Adduct reactions may be base or acid catalyzed, with base catalyzation preferred.

The organic polyol may be a polyester polyol, such as a polyester of a dicarboxylic acid, acid halide or anhydride and a polyol, such as those characterized above. In this case, it is desirable to allow the polymer to be hydroxyl terminated, and conventional procedures in the art are useful for this purpose. A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane.

Polyester resins usable as the thermosetting matrix resin, are typically reaction products of a dicarboxylic acid, acid halide or arthydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups, saturated aliphatic, heteroaliphatic and aromatic polycarboxylic acids, and the like. Such acids include maleic acid or anhydride, fumaric acid, methyl maleic acid, and itaconic acid (maleic acid or anhydride and fumaric acid are the most widely used commercially), saturated and/or aromatic dicarboxylic acids or arthydrides such as phthalic acid or anhydride, terephthalic acid, hexahydrophthalic acid or anhydride, adipic acid, isophthalic acid, and "dimer" acid (i.e., dimerized fatty acids). They may be cured by providing a polymerization initiator and low viscosity crosslinking monomers in the formulation. Where the resin is a unsaturated polyester or vinyl ester, it is preferred that the toohomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as alpha-methyl styrene, alpha-chlorostyrene, 4-methylstyrene, and the like, divinylbenzene, acrylonitrile, methacrylonitrile, and the like. Styrene is the preferred monomer in commercial practice today, although others can be used. Suitable polymerization initiators include t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester and the crosslinking monomer.

When desired, a thickening agent can also be employed in the polyester thermosetting compositions. Such materials are known in the art, and include the oxides and hydroxides of the metals of Group I, II and III of the Periodic Table . Illustrative examples of thickening agents include magnesium oxide, calcium oxide, calcium hydroxide, zinc oxide, barium oxide, magnesium hydroxide and the like, including mixtures of the same. Thickening agents are normally employed in proportions of from about 0.1 to about 6 weight percent, based upon weight of the polyester resin and crosslinking monomer.

Particularly desirable materials for rendering the thermosetting resin non-pourable are thixotropic agents and/or elastomer-type polymers that provide discrete elastomer phases (second phases) in the thermosetting resin matrix. Certain of these materials may reduce, to some finite degree, the crosslinking density of the thermoset resin (C-stage). Many of these materials introduce very favorable properties to the resulting thermoset resin. For example, a particularly desirable material for this purpose, is an elastomeric polymer containing soft and hard segments, the hard segments acting like or forming on processing, crosslinking of the elastomeric type. Some of these elastomeric types contain functional end groups which allow it to couple with complementary functional monomers or polymers to form the desired elastomer in situ of the thermosetting resin and render it non-pourable and tacky, while toughening the cured resin. As a class, these elastomeric polymers act crosslinked or are crosslinked yet are thermoprocessable, so that when they are discretely provided in the matrix resin, they toughen the resin and make them non-pourable and tacky.

One class of suitable elastomer-type thermosplastic ABS (acrylonitrile-1,4-butadiene-styrene) block copolymers that are typically used as modifiers of other resin systems. They are characterized as having a wide range of properties though the preferred systems of the invention utilize copolymers that are high rubber types that, when compared to other copolymers of this type, have a relatively low tensile strength, low tensile modulus, higher impact resistance, low hardness and heat deflection temperature. Another elastomer that is found desirable are the carboxyl and amine terminated liquid butadiene acrylonitrile copolymers. Such copolymers may contain pendant carboxyl groups in the interior of the polymer structure through the inclusion of methacrylic or acrylic acid in the polymerization or through the hydrolysis of some of the pendant nitrile units. Such polymers react with the epoxy resin and as a result, the epoxy forms the hard segment generating the elastomer properties.

Another class of block thermoplastic elastomers are Kraton ®, available from Shell Chemical Company. These thermoplastic rubber polymers possess usable thermoplastic properties. They can be softened and they flow under heat and pressure. They then recover their structures on cooling. The chemical make-up are of three discrete blocks of the linear or A-B-A type. They are available as styrene-butadiene-styrene (S-B-S) block copolymers, styrene-isoprene-styrene (S-B-S) block copolymers and styrene-ethylene/butylene-styrene (S-EB-S) block copolymers. They are characterized by styrene polymer endblocks and an elastomeric midblock. After processing, the polystyrene endblocks physically crosslink, locking the rubber network in place. This physical crosslinking is reversible on heating.

Another series of the Kraton ® thermoplastic rubbers are the diblock polymers in which one block is a hard thermoplastic and the other is a saturated soft elastomer. Illustrative of this series is Kraton ® G 1701, a diblock polymer of a hard polystyrene block and a saturated, soft poly(ethylene-propylene) block.

Other rubbers or elastomers include: (a) homopolymers or copolymers of conjugated dienes having a weight average molecular weight of 30,000 to 400,000 or higher as described in U.S. Pat. No. 4,020,036, in which the conjugated dienes contain from 4–11 carbon atoms per molecule such as 1,3-butadiene, isoprene, and the like; (b) epihalohydrin homopolymers, a copolymer of two or more epihalohydrin monomer, or a copolymer of an epihalohydrin monomer(s) with an oxide toohomer(s) having a number average molecular weight ($M_n$) which varies from about 800 to about 50,000, as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene/norbornadiene, as described in U.S. Pat. No. 4,161,471; (e) conjugated diene butyl elastomers, such as copolymers consisting of from 85 to 99.5% by weight of a $C_4$–$C_5$ isolefin combined with 15 to 0.5% by weight of a conjugated multi-olefin having 4 to 14 carbon atoms, copolymers of isobutylene and isoprene where a major portion of the isoprene units combined therein have conjugated diene unsaturation, as described in U.S. Pat. No. 4,160,759.

Specific illustrations of suitable elastomeric polymers are the following:

1. Hycar® CTBN liquid reactive rubbers, carboxyl terminated butadiene-acrylonitrile copolymers sold by B. F. Goodrich.
2. Hycar® CTBNX, similar to CTBN except that they contain internal pendant carboxyl groups, also supplied by B. F. Goodrich.
3. Hycar® ATBN, amine terminated butadiene-acrylonitrile copolymers sold by B. F. Goodrich.
4. K 1102-28:72 styrene:butadiene linear SBS polymer, available from Shell Chemical Company under the registered trademark "Kraton" 1102.
5. KDX 1118-30:70 styrene:butadiene copolymer containing 20% SBS triblock and 80% SB diblock, available from Shell Chemical Company under the registered trademark "Kraton" DX 1118.
6. KG 1657-14:86 styrene:ethylene-butylene:styrene copolymer available from Shell Chemical Company under the registered trademark "Kraton" G1657.
7. S 840 A-Stereospecific 43:57 styrene-butadiene SB rubber available from Firestone Synthetic Rubber & Latex Company under the registered trademark "Stereon" 840A.
8. SBR 1006-random 23.5:76.5 styrene:butadiene SB block copolymer rubber available from Goodrich Chemical Company under the registered trademark "Ameripol" 1006.
9. SBR 1502-Random 23.5:77.5 styrene:butadiene rubber available from Hules Mexicanos, or from Goodrich Rubber Company as "Ameripol" 1502.
10. Cycolac® Blendex modifier resins (e.g., 305, 310, 336 and 405)-ABS polymers sold by Borg-Warner Chemicals, Inc. Different varieties are available and their suitability depends on the properties sought.

Additional flow reductions are provided by thixotroping agents such as fumed silica. Illustrative of thixotropic agents are high surface area famed silicas and organosilyl blocked fumed silicas, and the like.

Typically, the resin system comprises 40–95% by volume of the filled system, with 45–70% resin volumes preferred. Volume loading of the fillers will depend upon the size, shape and surface energy of the filler particles. It is desirable to combine sizes and shapes to afford optimum performance.

Usually, the asymmetrical shapes, such as mica platelets and wollastonite rods, are incorporated at 0–10% volume loadings. Spherical shapes are generally incorporated in larger volumes (up to 60%) and, preferably, have a multimodal particle size distribution of from 1–100 microns. Angular shapes may be used at loading levels similar to those for the spherical shapes. Surface treatments, e.g., silane coupling agents, reduce surface energies of the fillers, which enables higher loading levels.

Illustrative silane coupling agents are the epoxycyclohexylethyltrialkoxysilanes, the aminoalkyltrialkoxysilane, and the gamma-methacryloxypropyl trialkoxysilanes, and the like.

The filled resin system may be cast into a thin film, typically 3–20 mils, by hot melt techniques. The carrier fabric may be heat tacked onto one side of the resin film, providing the finished form suitable for compositing to the lightning strike screens or foils. A variation includes addition of the lightweight, highly conductive metallic wire screen or foil placed on top of the carrier cloth. Preferred screen or foils made of copper, aluminum or silver and of the expanded foil types of 0.01 psf–0.04 psf areal weight, may be secured to the carrier fabric.

These filled resin films with lightning strike protection may be cocured onto the surfaces of fiber reinforced composite structures. The prepregs used for composite structures can be woven or unidirectional fiber forms. Fiber types include, among others, carbon, glass, Kevlar ™ and quartz. Resin contents of 34–45% have been used. Typical matrix resins include, among others, epoxy, polyester and phenolic, as noted above. Typical surfacing substrates are honeycomb stiffened, multilayered composite structures, although the application on non-honeycomb stiffened composites parts is also useful.

The supported filled resin surfacing film is applied, resin side down, onto the tool face. Typical tools include, among others, aluminum, steel and graphite, and may be flat or contoured. The tool is typically sanded smooth and treated with a release agent such as Frekote ® 700. First, the conductive metal screen or foil layer is laid on top of the supported back of the resin film, followed by deposition of the prepreg layers and honeycomb core (if used). Cure is facilitated by standard vacuum bag and autoclave techniques. Temperature and pressure of the cure is dependent upon the reactivity of both the prepreg resin and the resin system in the surface film. Typically, cure temperatures of 120° C.–175° C. are used. Cure pressures from 28" Hg vacuum to 45 psi are typical for honeycomb stiffened structures, and may be greater for solid laminate structures.

| Formulation | Percent By Weight | Preferred Percent By Weight |
|---|---|---|
| Bisphenol A epoxy resin. A preferred resin comprises a mixture of available commercial resins such as (a) a solid resin and a liquid resin; or (b) a mixture of liquid resins; or (c) a mixture of a liquid Bisphenol A epoxy resin and low molecular weight novolak epoxy resin. | 35 to 80 | 40 to 70 |
| An elastomer toughening agent. A desirable toughening agent may be a carboxylated butadiene acrylonitrile copolymer elastomer; an ABS block copolymer elastomer; and SBS block copolymer elastomer. | 0 to 12 | 2 to 9 |
| Hydroxyl extender for the epoxy resin(s). A useful extender is bisphenol A. | 0 to 20 | 4 to 12 |
| Amine curing agent. Preferred amine curing agents include | 3 to 12 | 3.5 to 10 |

-continued

| Formulation | Percent By Weight | Preferred Percent By Weight |
|---|---|---|
| dicyandiamide, ureas, to aliphatic and aromatic amines such as aliphatic amines, alkylene oxide amines, aromatic amines and aromatic ureas. | | |
| Diluent. | 0 to 2 | 0 |
| A variety of conventional ether, ketone, acetate, and the like diluent may be added to facilitate compatibility. They are typically removed by evaporation once the film is formed. | | |
| Wetting Agent(s) | 0 to 2 | 0.25 to 1.0 |
| Antifoam | 0 to 1 | 0.05 to 0.5 |

The filler formulations that may be incorporated with the resin formulation include the following combinations:

| Filler | Weight % | Volume % |
|---|---|---|
| Formulation 1 | | |
| zinc oxide | 5.1 | 1.2 |
| Wollastonite | 7.2 | 3.3 |
| Fumed Silica | 2.4 | 1.4 |
| Formulation 2 | | |
| Fumed Silica | 0.6 | 0.2 |
| Muscovite Mica | 1.9 | 0.9 |
| Zeeosphere 800 | 1.9 | 1.2 |
| Fused Silica | 28.1 | 15.6 |
| Spherecoat 125 | 18.7 | 32.5 |
| Formulation 3 | | |
| Fumed Silica | 0.7 | 0.3 |
| Muscovite Mica | 8.1 | 3.1 |
| Zeeosphere 800 | 8.2 | 4.5 |
| Spherecoat 125 | 24.2 | 38.1 |
| Formulation 4 | | |
| Fumed Silica | 1.5 | 1.0 |
| Zeeosphere 850 | 49.4 | 37.3 |

In the above formulations:
Zinc oxide - median particle size of 0.4 microns, angular particle shape
Wollastonite - Wollastonite acicular calcium metasilicate, median particle diameter of 2.3 microns and aspect ratio of 15-20:1
Fumed Silica - submicron amorphous silica; thixotroping agent
Muscovite Mica - 325 mesh hydrous aluminum potassium silicate. Thin platelets of median particle size, about 35 microns.
Zeeosphere 800 - silica alumina ceramic microspheres of median particle size, about 3 microns (sold by Zeelan Industries)
Zeeosphere 850 - silica alumina ceramic microspheres of median particle size, about 17 microns (sold by Zeelan Industries)
Fused Silica - particulate amorphous silica of median particle size, about 13 microns; angular particle shape
Spherecoat 125 - surface treated ceramic hollow microspheres of median particle size, about 85 microns (sold by NYCO)

These filled resin formulations are made by conventional mixing of the components in standard mixing equipment for viscous compositions. For example, they may be mixed in a Ross TM Double Planetary Mixer, provided with vacuum construction and jacketing to control temperature and deaerate the mixture. Mixing is typically effected by blending the resin, elastomer components, extenders, diluents, curing agent and fillers (these being added last), and vacuum pumping to remove entrained air. The temperature chosen is variable depending on the viscosity of the formulation. It may be desirable to separately mix the resin and the curing agent. In such a case, the formulation may be divided up to mix the resin with some portion of the formulation to effect a well dispersed condition and do the same with the curing agent, and then combine the well dispersed mixes with the filler components, so as to mix them all under conditions avoiding premature reaction. Such procedures are well within the skill of the art.

A typical composite construction is illustrated by the following: A layer of two plies of uncured Fiberite TM 934 carbon fiber prepreg (3K, plain weave, 40% resin content) are positioned on top of lightning strike screen layer, with the first ply having a ±45° orientation and the second a 0/90° orientation. Nomex honeycomb (0.5 in. thick, 0.125 in. cell size, 3.0 lb/ft$^3$ density and cut with a 20° beveled edge) is next using doubler strips of the prepreg to build bulk from the edge of the honeycomb to the edge of the laminate. The panel is completed with two plies of prepreg, first in the 0/90° direction and then in the ±45° direction. The completed laminate is vacuum bagged and cured for one hour at 177° C. using a 2.36° C./min heat-up rate and 45 psi autoclave pressure.

I claim:

1. A lightning strike coating composite comprising a sheet of lightweight carrier fabric containing (a), on one side, a coating of a highly filled, thermoset resin with a filler volume loading of from 5 to 60 percent in which the filler comprises a multimodal combination of filler particles having different median particle diameters, and (b), on the other side, an adhesive joining the carrier fabric to a lightweight, highly conductive metallic wire screen or foil layer having mesh openings.

2. The lightning strike coating composite of claim 1 wherein the highly conductive metallic wire screen or foil layer is made of copper, aluminum, nickel or silver.

3. The lightning strike coating composite of claim 1 wherein the filler particles comprise a combination of one or more of asymmetrical, angular and spherical shaped particles.

4. The lightning strike coating composite of claim 1 wherein the highly conductive metallic wire screen or foil layer weighs from 0.01 psf to 0.08 psf.

5. The composite of claim 1 wherein the carrier fabric is a nonwoven fabric.

6. The composite of claim 2 wherein the carrier fabric is a nonwoven fabric.

7. The composite of claim 3 wherein the carrier fabric is a nonwoven fabric.

8. The composite of claim 4 wherein the carrier fabric is a nonwoven fabric.

* * * * *

UNITED STATES PATENT AND TRADEMARK OFFICE
CERTIFICATE OF CORRECTION

PATENT NO. : 5,370,921
DATED : December 6, 1994
INVENTOR(S) : Calvin P. Cedarleaf It is certified that error appears in the above-indentified patent and that said Letters Patent is hereby corrected as shown below:

In the title on the first page, after "COMPOSITE", delete "AND PROCESS".

In column 1, line 1, in the title, after "COMPOSITE", delete "AND PROCESS".

In column 22, at the end of line 46, change "1" to read ---2---.

Signed and Sealed this

Fourteenth Day of March, 1995

Attest:

BRUCE LEHMAN

Attesting Officer   Commissioner of Patents and Trademarks